United States Patent [19]
Vlasblom

[11] 3,829,981
[45] Aug. 20, 1974

[54] CLINOMETER FOR DETERMINING THE ORIENTATION OF A BODY DRIVEN OR TO BE DRIVEN INTO THE EARTH

[75] Inventor: Adriaan Vlasblom, Oranjelaan, Netherlands

[73] Assignee: Stichting Waterbouwkundig Laboratorium, Delft, Netherlands

[22] Filed: Apr. 14, 1972

[21] Appl. No.: 243,967

[30] Foreign Application Priority Data
Apr. 29, 1971 Netherlands.......................... 715964

[52] U.S. Cl........................ 33/312, 33/366, 33/395
[51] Int. Cl. ... E21b 47/022, G01c 9/06, G01c 9/16
[58] Field of Search ............. 33/366, 312, 304, 313, 33/395, 363 R, 300

[56] References Cited
UNITED STATES PATENTS
1,589,767   6/1926   Tapley ................................. 33/366
2,190,950   2/1940   Potapenko ........................... 33/312
2,429,620   10/1947  Harrington .......................... 33/366
2,924,886   2/1960   Cullen ................................ 33/363 R
3,421,227   1/1969   Turner et al. ....................... 33/366

FOREIGN PATENTS OR APPLICATIONS
1,175,606   12/1969  Great Britain .................... 33/363 R Primary Examiner—William D. Martin, Jr.
Assistant Examiner—Richard R. Stearns
Attorney, Agent, or Firm—Smyth, Roston & Pavitt

[57] ABSTRACT

A clinometer for determining the orientation in respect of the vertical of a body driven into the earth or of a bore hole, comprising one pendulum or two pendulums with mutually perpendicular oscillation planes, each pendulum being provided with a magnet and cooperating with a Hall device generating a Hall voltage which is a function of the orientation of the pendulum in question.

6 Claims, 5 Drawing Figures

PATENTED AUG 20 1974　　　3,829,981

CLINOMETER FOR DETERMINING THE ORIENTATION OF A BODY DRIVEN OR TO BE DRIVEN INTO THE EARTH

For investigating the character, and in particular the bearing capacity, of the soil, a sounding tube is used, the extremity of which carries a conical tip which is connected to the sounding tube by means of a deformable measuring body provided with strain gauges. When such a tube, which may be provided with extension tubes if required, is driven into the earth, the resistance of the different soil layers may be measured in this manner. Such a sounding tube may, furthermore, be provided with a sleeve which is coupled to this tube in a similar manner, for determining the resistance to lateral friction of the surrounding layers.

The usual sounding tubes have a relatively small diameter and are driven into the earth to a great depth, so that it is not possible to keep those tubes always exactly vertical. In order to obtain useful measuring data, the resistance measurements should be related to the correct depth.

Therefore, there exists a need for clinometer which is able to indicate continuously and with a great sensitivity and accuracy a deviation of such a tube from the vertical, and which, nevertheless, has sufficiently small dimensions for being inserted into the lower part of a sounding tube.

For this purpose use has already been made of unilaterally fixed resilient strips provided with strain gauges, as described in Netherlands Pat. No. 71,046. A disadvantage is, however, that the accuracy of such a clinometer is insufficient.

For determining the inclination of bore holes for mine pits or the like it is known to use pendulums adapted to actuate electric contacts for controlling servo-motors, as described in Netherlands Pat. No. 4,024, which motors are used for adjusting the contacts cooperating with a pendulum so that these contacts follow the corresponding pendulum. Such a clinometer is, therefore, rather complicated and liable to failure, and its operation is relatively slow and inaccurate.

The object of the invention is to provide a clinometer not having the disadvantages of the known clinometers, and being, in particular, adapted to be inserted into a sounding tube of the kind mentioned above, but, of course, such a clinometer may also be used for other purposes.

To that end the clinometer according to the invention comprises one or more pendulums each being suspended in a casing having a longitudinal axis which may be maintained parallel to the axis of the body of which the orientation is to be determined, the pivot axis of each pendulum being directed transversely to the longitudinal axis of this casing, means being provided for determining the deviation between the longitudinal axis of this casing and the vertical indicated by the pendulum in question, which means comprises a magnet connected to this pendulum, the casing of each pendulum being provided with a Hall plate, the plane of which is directed substantially perpendicularly to the axis of the casing.

In order to obtain also an indication of the sense of the deviation of a pendulum, a magnet is preferably used having a magnetization directed transversely to the pivot axis and also transversely to the longitudinal axis of the pendulum. A substantially linear indication in a wide range is obtained if the magnet is a cylindrical body having an axis which substantially coincides with the pivot axis of the pendulum.

Adjustment of the sensitivity and correction of the zero-point may be easily obtained by mounting the Hall plate in such a manner that it may be translated along the longitudinal axis and may be rotated around that axis respectively.

Such clinometers may be fixed in a sounding tube, but may also be suspended on a torsion-free cable for being lowered in a tube or bore hole. In the case of a fixed mounting in a sounding tube or similar body, an external mark will be provided corresponding with the oscillation plane of one of the clinometers.

When two clinometers with perpendicular oscillation axis are used, it is preferred to provide between both a magnetic shielding.

The invention will be elucidated below by reference to the drawing, as described below:

Figure 1:
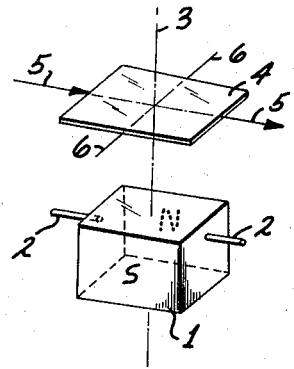
FIG. 1 is a diagrammatic representation in perspective for explaining the principle of the invention.

In FIG. 1 the principle of the clinometer according to the invention is diagrammatically shown. This clinometer comprises a magnet 1 forming a part of a pendulum which may oscillate around a pivot axis 2 situated above the center of gravity of the whole assembly. The axis 2 is perpendicular to the longitudinal axis 3 of a body, the inclination of which in respect of the vertical is to be measured. Furthermore, the direction of magnetization of the magnet 1 is substantially perpendicular to the axis 2, and is in the vertical orientation of the axis 3, also perpendicular to the latter axis when the magnet 1 is at rest. The field strength is, in that case, more in the axis 3.

Furthermore, the clinometer comprises a Hall plate 4 with terminals 5 for the control current, and electrodes 6 for deriving the Hall voltage, the latter electrodes being transverse to the direction of the control current. The plane of the Hall plate 4 is substantially perpendicular to the axis 3. As a consequence of the transverse magnetization of the magnet 1, the Hall voltage at a deviation of the magnet in one sense in respect of the axis 3 will be opposite to the voltage at an opposite deviation.

If the magnet 1 is a cylindrical body having an axis which substantially coincides with the pivot axis 2, the magnetic field along axis 3 will vary substantially in a sinusoidal characteristics when the body oscillates on axis 2 so that, in a wide range of pendulum deflections, a linear relationship between the deviation angle and the Hall voltage at the electrodes 6 is obtained. If the bearings of the pivot 2 are fixedly mounted in the body of which the inclination is to be determined, the magnet will try to remain as vertically as possible during such changes of the orientation of the body, because upon tilting of the body, the force of gravity has a component lying in the plane perpendicular to the pivot axis, tending to restore vertical position of the magnet in the sense that a vertical through the center of gravity of the magnet intersects axis 2. Therefore, the magnet will, then, assume an orientation corresponding with the projection of the vertical on the plane of oscillation. It will be clear that for a complete determination of the orientation two clinometers with mutually perpendicular axes 2 are required.

Figure 2A:
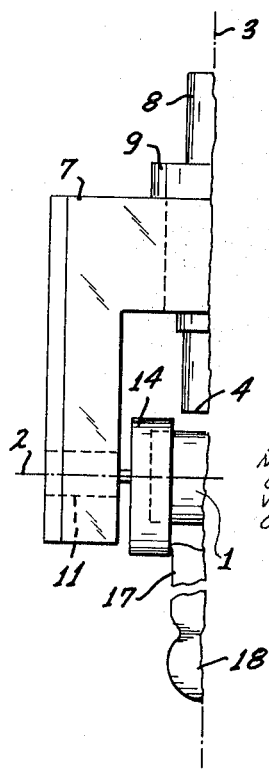
FIG. 2A is a side view of a clinometer according to the invention.
Figures 2B, 4:
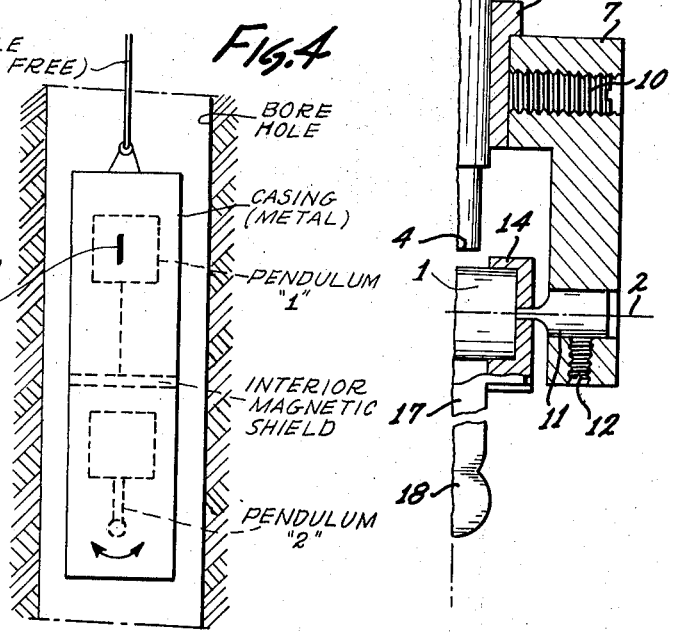
FIG. 2B is a complementary section view.
FIG. 4 is a schematic view of two clinometers with pendulums in transverse planes and suspended in a bore hole.

FIG. 2A shows a front view, and FIG. 2B shows a sectional view, of an embodiment of such a clinometer. This clinometer comprises a symmetrical yoke 7 to be mounted in the body in question, and having an axis corresponding with the axis 3 of FIG. 1, in which yoke a pin 8 directed according to this axis is mounted by means of a sleeve 9, which is rotatable and axially movable in the yoke, and may be fixed by means of a set screw 10. This pin carries at its lower extremity the Hall plate 4, and, furthermore, comprises the connecting leads 5 and 6 not shown.

Figure 3:
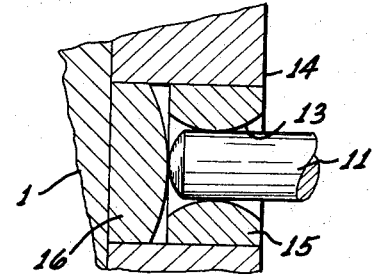
FIG. 3 is an enlarged partial section of the pivotal suspension of the magnet of such a clinometer.

The axis 2 is determined by pivot pins 11 which may be fixed by means of set screws 12, and which, on the other hand, extend in suitable holes 13 of a fitting 14 for the magnet 1. As clearly appears from FIG. 3, in each hole 13 a radial bearing block 15 and an axial bearing block 16 are provided, the material and surface shape of which are such that the friction is as small as possible when the pin 11 in question is supported substantially without clearance, and the remaining clearance may be substantially eliminated by displacing the pins 11.

At the lower end of the fitting 14, a pendulum 17 is attached, the lower extremity of which carries a vane 18 used for aligning the magnet when adjusting the clinometer. The sensitivity of the clinometer may be adjusted by axially translating the sleeve 9, and by rotating this sleeve a correction of the zero-point may be effected.

It has appeared to be possible to obtain a linear relationship between the inclination angle and the Hall voltage with such a clinometer comprising a transversely magnetized cylindrical magent within an angular range of at least 25° at both sides of the neutral position.

Such a clinometer may be lowered by a torsion-free cable in a hollow body or a bore hole. This clinometer is, however, designed in the first place for being fixedly mounted inside a sounding tube for determining the soil resistance, and two of such meters are, then, arranged with crossed axes in the lowermost sounding tube. The yoke may then be provided with an outer surface adapted in the inner bore of a sounding tube. The lowermost tube is, then, provided with a mark corresponding with the oscillation plane of one of the clinometers.

I claim:

1. A clinometer for determining the direction of a bore hole and particularly any deviation of that direction from the vertical, comprising:

a support means defining a longitudinal axis and provided for disposition in the bore so that the axis assumes an orientation corresponding to said direction;

a pendulum pivotally supported by said support means for pivotable movement about a pendulum axis extending transversely to and intersecting said longitudinal axis, the pendulum including a permanent magnet with an axis of symmetry coinciding with said pendulum axis, the permanent magnet having a direction of magnetization which extends orthogonally to both said pendulum axis and said longitudinal axis; and a Hall effect device having a first axis defining the direction of electric current bias for the device and a second axis along which a Hall voltage is taken, said Hall effect device being mounted to said support means so that said first and second axes extend transversely to said longitudinal axis, said Hall effect device being mounted in symmetrical relation to a plane as defined by said longitudinal axis and said pendulum axis, and above said magnet but spaced apart therefrom.

2. A clinometer is in claim 1, including means for mounting the Hall effect device in the support means for rotational adjustment of the Hall effect device about said longitudinal axis.

3. Clinometer as in claim 1, including means for magnetically shielding the Hall effect device against the environment.

4. Clinometer as in claim 1, the support means being suspended in the bore hole by a torsion-free cable.

5. Clinometer as in claim 1, the support means being provided with mark means on the surface thereof for indicating the orientation of said pendulum axis with respect to said support means.

6. Clinometer according to claim 1, characterized in that the magnet is a cylindrical body having an axis substantially coinciding with the pivot axis.

* * * * *